United States Patent
Maruyama

(10) Patent No.: US 8,299,270 B2
(45) Date of Patent: Oct. 30, 2012

(54) CLAY MODIFIED ELECTROLYTE FOR A DYE-SENSITIZED SOLAR CELL

(75) Inventor: Tsukasa Maruyama, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 556 days.

(21) Appl. No.: 12/377,397

(22) PCT Filed: Aug. 14, 2007

(86) PCT No.: PCT/JP2007/066077
§ 371 (c)(1),
(2), (4) Date: Feb. 13, 2009

(87) PCT Pub. No.: WO2008/020643
PCT Pub. Date: Feb. 21, 2008

(65) Prior Publication Data
US 2010/0275979 A1 Nov. 4, 2010

(30) Foreign Application Priority Data

Aug. 14, 2006 (JP) ................................ 2006-221261
Aug. 10, 2007 (JP) ................................ 2007-210121

(51) Int. Cl.
*C07D 403/06* (2006.01)
*H01G 9/022* (2006.01)
*H01L 31/04* (2006.01)
*H01M 6/00* (2006.01)

(52) U.S. Cl. ............... 548/314.4; 548/312.7; 548/311.1; 548/300.1; 252/62.2; 136/263; 429/111; 429/300; 429/304; 429/306; 429/310; 429/315; 429/479; 429/504

(58) Field of Classification Search .................. 429/111, 429/479, 504, 300, 304, 310, 306, 315; 252/62.2; 136/263; 548/314.4, 312.7, 311.1, 300.1
See application file for complete search history.

(56) References Cited

U.S. PATENT DOCUMENTS 4,927,721 A 5/1990 Gratzel et al.

FOREIGN PATENT DOCUMENTS

| EP | 1180774 | | 2/2002 |
|---|---|---|---|
| EP | 1341196 | | 9/2003 |
| JP | 2001015166 A | * | 1/2001 |
| JP | 2002075442 A | * | 3/2002 |
| JP | 2002298935 | | 10/2002 |
| WO | WO-9518456 | | 7/1995 |
| WO | WO-2005096392 | | 10/2005 |
| WO | WO 2005096392 A2 | * | 10/2005 |

OTHER PUBLICATIONS

Grant & Hackh's Chemical Dictionary (5th Ed. 1987) at 409.*
CP Miller & MJ Evans, The Chemist's Companion Guide to Patent Law (2010) at 220, 305.*
Letaief et al., "Nanohybrid materials from the intercalation of imidazolium ionic liquids in kaolinite," Journal of Materials Chemistry, vol. 17, No. 15, 2007, pp. 1476-1484.

* cited by examiner

*Primary Examiner* — Jason M Nolan
(74) *Attorney, Agent, or Firm* — Connolly Bove Lodge & Hutz LLP

(57) ABSTRACT

A gel-like or solid electrolyte containing (i) an electrolyte solution containing an electrolyte dissolved in an organic solvent, (ii) a lamellar clay mineral and/or an organically modified lamellar clay mineral and (iii) a polyvalent onium salt compound and a photoelectric transducer element and a dye-sensitized solar cell using the same.

12 Claims, 1 Drawing Sheet

US 8,299,270 B2

CLAY MODIFIED ELECTROLYTE FOR A DYE-SENSITIZED SOLAR CELL

CROSS REFERENCE TO RELATED APPLICATIONS

This application is a National Stage of PCT/JP2007/066077 filed Aug. 14, 2007 which in turn claims priority from Japanese Application 2006-221261 filed Aug. 14, 2006 and Japanese Application 2007-210121 filed Aug. 10, 2007, the entire contents of which are incorporated herein by reference.

TECHNICAL FIELD

The present invention relates to a dye-sensitized solar cell and its electrolyte, more particularly relates to a dye-sensitized solar cell and a gel or a solid electrolyte used in the solar cell.

BACKGROUND ART

A photoelectric transducer is a device which converts a light energy to an electrical energy and is, for example, utilized as a solar cell. As examples of such solar cells, silicon-based solar cells, semiconductor compound solar cells and the like can be mentioned. The dye-sensitized solar cell recently developed by Grätzel et. al. of Switzerland has a high photoelectric conversion efficiency, among the solar cells, using organic materials, is lower in product costs, compared with silicon-based solar cells, and has other advantages and, therefore, has been attracted, as a new type of solar cell. However, a dye-sensitized solar cell is an electrochemical cell and, therefore, an organic electrolyte solution, ionic liquid, etc. is used as the electrolytes (for example, see U.S. Pat. No. 4,927,721). When using an organic electrolyte solution, there was the problem of the power generating efficiency ending up dropping due to volatilization and depletion during long term use. Further, when using an ionic liquid as an electrolyte, while volatilization and depletion during long term use could be prevented, there were problems due to leakage (for example, see WO 95/18456). It is also known to use a solid or gel-like organic electrolyte substantially not containing any organic solvent for the electrolyte of a photoelectric chemical cell (for example, see Japanese Patent Publication (A) No. 2002-298935).

The present inventors, considering the trends of such prior art, first developed an electrolyte for a photoelectric transducer element free from the problems of volatilization and dry-up of the electrolyte solution even at the time of long term use, free from the problem of leaks, superior in power generating effect, and giving an equal or better performance, as a conventional photoelectric transducer element using an electrolyte containing an ionic liquid and a photoelectric transducer element and dye-sensitized solar cell using the same (see PCT/JP2005/6716). This electrolyte is an electrolyte for a photoelectric transducer element which contains (i) a lamellar clay mineral and/or organically modified lamellar clay mineral and (ii) an ionic liquid.

SUMMARY OF THE INVENTION

An object of the present invention is to further increase the photoelectric conversion efficiency of a gel electrolyte for a dye-sensitized solar cell containing a lamellar clay mineral and/or organically modified lamellar clay mineral.

In accordance with the present invention, there are provided a gel-like or solid electrolyte containing (i) an electrolyte solution containing an electrolyte dissolved in an organic solvent, (ii) a lamellar clay mineral and/or an organically modified lamellar clay mineral, and (iii) a polyvalent onium salt compound and a photoelectric transducer element and dye-sensitized solar cell using the same.

According to the present invention, by jointly using a polyvalent onium salt in a clay-gel electrolyte comprising a lamellar clay mineral and/or organically modified lamellar clay mineral and an electrolyte solution, the clay content required for gelling of the electrolyte can be decreased, whereby the photoelectric conversion efficiency can be increased.

According to the present invention, further, by jointly using a polyvalent onium salt in a clay-gel electrolyte, the clay content can be increased, while maintaining an efficiency equal to or better than the photoelectric conversion efficiency exhibited by the liquid electrolyte before gelling, the degree of gelling of the electrolyte can be increased, and solidification becomes possible.

BRIEF DESCRIPTION OF THE DRAWINGS

The present invention will now be explained with reference to the accompanying drawings; wherein.

BEST MODE FOR CARRYING OUT THE INVENTION

Figure 1:
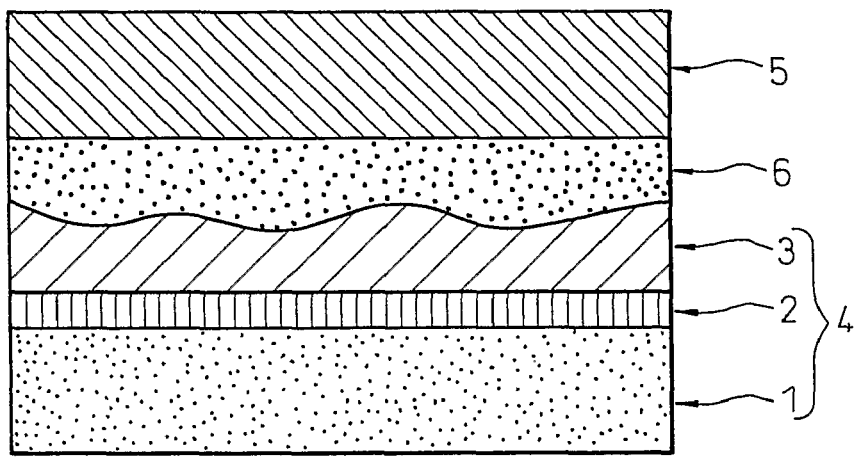
FIG. 1 A diagram showing one example of the basic structure of a dye-sensitized solar cell according to the present invention.

As used in the specification and the claims, the singular forms "a", "an", and "the" include plural referents unless the context clearly dictates otherwise.

The present inventor engaged in research in order to solve said problem and, as a result, succeeded in decreasing the clay content required for gelling the electrolyte and increasing the photoelectric conversion efficiency by jointly using a polyvalent onium salt in the clay-gel electrolyte as a gel-like electrolyte of a dye-sensitized solar cell. The present inventor also engaged in research in order to solve said problem and, as a result, succeeded in increasing the ion conductivity of the gel-like electrolyte, which is higher than that of the liquid electrolyte before the gellation increasing the clay content, increasing the degree of gellation of the electrolyte and enabling the electrolyte to be solidified, by jointly using a polyvalent onium salt in the clay-gel electrolyte as a gel-like electrolyte of a dye-sensitized solar cell. This seems to be due to the fact that the polyvalent onium salt is patterned along with the clay sheet, whereby a path of iodine ion is formed. The present inventor further engaged in research in order to solve said problem and, as a result, succeeded in enabling the clay content to be increased, while maintaining an efficiency equal to or better than the photoelectric conversion efficiency exhibited by the liquid electrolyte before gelling, in enabling the degree of gelling of the electrolyte can be increased, and in enabling solidification by jointly using a polyvalent onium salt in the clay-gel electrolyte, as a gel-like electrolyte of a dye-sensitized solar cell.

According to the present invention, a gel-like or solid electrolyte used for a dye-sensitized solar cell is made from (i) an electrolyte solution containing an electrolyte dissolved in an organic solvent, (ii) a lamellar (or layered) clay mineral and/or organically modified lamellar (or layered) clay mineral, and (iii) a polyvalent onium salt compound. The amounts of these ingredients (i) to (iii) are not particularly limited, but are preferably, based upon 100 parts by weight of electrolyte solution comprising an electrolyte dissolved in an organic solvent, a lamellar clay mineral and/or organically modified lamellar clay mineral of preferably 1 to 60 parts by weight, more preferably 3 to 50 parts by weight, and a polyvalent onium salt compound of preferably 1 to 60 parts by weight, more preferably 3 to 50 parts by weight. If the amount of the lamellar clay mineral and/or organically modified lamellar clay mineral is too small, the electrolyte is liable not to be sufficiently gelled, which is not preferable, while if conversely too large, the photoelectric conversion efficiency is liable to be decreased, which also is not preferable. On the other hand, if the amount of the polyvalent onium salt compound is too small, the electrolyte is liable not to be sufficiently gelled, which is not preferable, while if conversely too large, the photoelectric conversion efficiency is liable to be decreased, which also is not preferable.

As the electrolyte usable in the present invention, any electrolyte which is generally being used or can be used in this industry can be used. For example, the redox pairs shown below can be mentioned. Specifically, iodine/iodide ions, bromine/bromide ions and the like can be used. For example, iodine with LiI, NaI, KI and other metal iodides, iodine with an iodide salt of a quaternary imidazolium compound, an iodide salt of a quaternary pyridinium compound, an iodide salt of a tetraalkyl ammonium compound and other iodine/iodide ion pairs; bromine with LiBr, NaBr, KBr and other metal bromides; bromine with a bromide salt of a quaternary imidazolium compound, a bromide salt of a quaternary pyridinium compound, a bromide salt of a tetraalkyl ammonium compound and other bromine/bromide ions; a ferrocyanic acid salt-ferricyanic acid salt, ferrocene-ferricenium salt and other metal complexes; a disulfide compound and a sulfur compound of a mercapto compound; hydroquinone and quinine; and the like can be mentioned. Preferably, redox pairs of iodine and iodide salts are preferable. These redox pairs can be used alone or in any mixtures thereof.

Further, it is possible to add an inorganic salt and/or organic salt for the purpose of increasing the short circuit current of the photoelectric transducer element. As a preferable inorganic salt and/or organic salt, alkali metal or alkali earth metal salts may be mentioned. Specifically, lithium iodide, sodium iodide, potassium iodide, magnesium iodide, calcium iodide, lithium trifluoroacetate, sodium trifluoroacetate, lithium thiocyanate, lithium tetrafluoroborate, lithium hexafluorophosphate, lithium perchlorate, lithium trifluoromethanesulfonate, lithium bis-(trifluoromethanesulfonyl)imide, etc. may be mentioned. These can be used alone or in any mixtures thereof. Further, it is possible to add pyridines and benzimidazoles for the purpose of increasing the open circuit voltage of the photoelectric transducer element. Specifically, methyl pyridine, ethyl pyridine, propyl pyridine, butyl pyridine, and other alkyl pyridines; methyl imidazole, ethyl imidazole and propyl imidazole, and other alkyl imidazoles; methylbenzimidazole, ethylbenzimidazole, propylbenzimidazole, and the other alkylbenzimidazole; may be mentioned. The addition amounts are not particularly limited and may be made like in the past so long as the object of the present invention is not impaired.

The organic solvent for dissolving the electrolyte in the present invention is not particularly limited so long as the electrolyte can be dissolved therein, but, for example, carbonic acid esters such as ethylene carbonate, propylene carbonate; ethers such as ethylene glycol dialkyl ether, propylene glycol dialkyl ether; alcohols such as ethylene glycol monoalkyl ether, propylene glycol monoalkyl ether; polyhydric alcohols such as ethylene glycol, propylene glycol; nitriles such as propionitrile, methoxypropionitrile, cyanoethyl ether; amides such as dimethyl formamide, N-methyl pyrrolidone; aprotic polar solvents such as dimethyl sulfoxide, sulforane may be mentioned. These solvents may be used alone or in any mixtures thereof. Further, from the viewpoint of flame resistance and nonvolatility, the use of an ionic liquid is desirable. The ionic liquid is not particularly limited. Any ionic liquid, which has conventionally been used as an electrolyte, may be used. Specifically, those described in Hiroyuki Ono ed., "Ionic Liquids: The Frontline and Future of Development", CMC Shuppan (2003), "The Functional Creation and Application of Ionic Liquids" NTS (2004), etc., that is, quaternary ammonium salts, imidazolium salts, pyridinium salts, pyrrolidinium salts, piperidinium salts, and the like (as the salts, for example, salts composed of anions such as $I^-$, $BF_4^-$, $PF_6^-$, $CF_3COO^-$, $CF_3SO_3^-$, $N(CF_3SO_2)_2^-$, $N(CN)_2^-$, $C(CN)_3^-$) may be mentioned. As preferable ionic liquids, aliphatic quaternary ammonium salts, imidazolium salts, pyridinium salts, piperidinium salts, and pyrrolidinium salts are mentioned. Particularly preferable are the imidazolium salts having the following formula (IV):

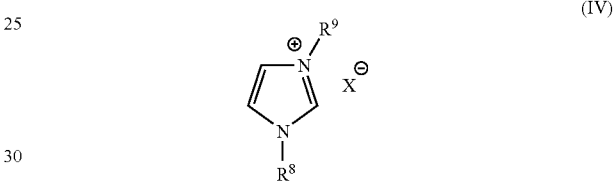

(IV)

wherein $R^8$ is a methyl group or an ethyl group, $R^9$ is a $C_1$ to $C_8$ hydrocarbon group, X is an anion such as $I^-$, $BF_4^-$, $PF_6^-$, $CF_3COO^-$, $CF_3SO_3^-$, $N(CF_3SO_2)_2^-$, $N(CN)_2^-$, $C(CN)_3^-$.

As the lamellar (or layered) clay mineral usable in the present invention, a phyllosilicate with silica tetrahedral bonded thereto in a 2-dimensional sheet-form is preferable. Specifically, for example, smectite-based clay minerals such as montmorillonite, saponite, beidellite, nontronite, hectorite, stevensite; vermiculite-based clay minerals such as vermiculite; micas such as muscovite, phlogopite; and other natural or synthetic clay minerals may be mentioned. Among these, the use of a smectite-based clay mineral swelled in water and having a cation exchange ability, expansible mica, and the like is preferable. The cation exchange amount of these lamellar clay minerals is preferably 10 to 300 mili-equivalents/100 g. In the present invention, particularly natural montmorillonite of Kunimine Industries Co., Ltd. (trade name Kunipia F), synthetic smectite of Kunimine Industries Co., Ltd. (Smecton SA), synthetic expansible mica of CO-OP Chemical Co., Ltd. (trade name: Somasif ME-100), and synthetic smectite (Lucentite SWN, SWF) are preferably used. As the lamellar clay minerals which can be used when producing the organically modified lamellar clay mineral used in the present invention, those illustrated above can be mentioned. The organically modified lamellar clay minerals can be obtained by cation exchange between the general layers. For example, it is possible to add organic onium ions in a water-based slurry of such a clay mineral, finish the reaction under stirring, then filter, wash, and dry the resultant desired clay minerals.

Here, although the organic onium ions are not particularly limited as long as the exchangeable inorganic ion of the lamellar clay mineral can be substituted with the organic onium ions, ammonium ions, phosphonium ion, oxonium ion, sulfonium ion, etc. may be exemplified. Among these ions, the ammonium ions are most general, a quaternary ammonium ion is preferable. Specifically, aliphatic ammonium ions, pyridinium ion, quinolinium ion, imidazolium ion, pyrrolidinium ion, piperidinium ion, betaines, lecithin, cationic dye (or coloring matter) may be exemplified. Preferably, quaternary ammonium ions represented by the general formulae (V) and (VI), for example, methylethylimidazolium, methylpropylimidazolium, methylbutylimidazolium, methylpentylimidazolium, methylhexylimidazolium, polyoxyethylene trialkylammonium, di(hydroxypolyoxyethylene)dialkylammonium, di(hydroxypropylene)dialkylammonium, etc. Examples of the organic onium salts including an organic onium ion are those composed of anions such as $Cl^-$, $Br^-$, $I^-$, $NO_3^-$, $OH^-$, $CH_3COO^-$, $CH_3SO_3^-$, etc. As the organic onium salts usable for the preparation of the organically modified lamellar clay minerals according to the present invention, the commercially available products (e.g, Ethoquad series products from Lion Corporation, ADEKA COL CC series products from Adeka Corporation) can be used.

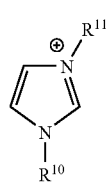

(V)

wherein $R^{10}$ is a methyl or ethyl group, $R^{11}$ is a $C_1$-$C_8$ hydrocarbon group.

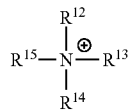

(VI)

wherein $R^{12}$ is a $C_1$-$C_{30}$ hydrocarbon group, $R^{13}$ and $R^{14}$ are independently a polyoxyethylene group ($-(CH_2CH_2O)_n-$H), polyoxypropylene group ($-CH_2CH(CH_3)O)_n-$H, $-(CH_3CH_3CH_3O)_n-$H) or $C_1$-$C_{10}$ hydrocarbon group, $R^{15}$ is a polyoxyethylene group (i.e., $-(CH_2CH_2O)_n-$H) or polyoxypropylene group (i.e., $-(CH_2CH(CH_3)O)_n-$H), $-(CH_2CH_2CH_2O)_n-$H), (where n=1-50).

Therefore, the conditions for making an organically modified lamellar clay mineral by organic onium ions according to the present invention are not particularly limited, but preferably they are organically modified by reacting with an organic onium ion in an amount of 0.3 to 2.0 times, more preferably 0.5 to 1.5 times, based upon the cation exchange capacity of the lamellar clay mineral, at a temperature of 10 to 95° C.

As organically modified lamellar clay mineral usable in the present invention, as commercially available products, for example, S-Ben NX, S-Ben WX, Organite, and Organite D of Hojun Co., Ltd., Lucentite SEN, Lucentite SPN, Lucentite SAN, Somasif MAE, Somasif MEE, and Somasif MMPE of CO-OP Chemical Co., Ltd., and the like may be mentioned.

The polyvalent onium salt compound usable in the present invention is preferably a compound having the following formulae (I) to (III):

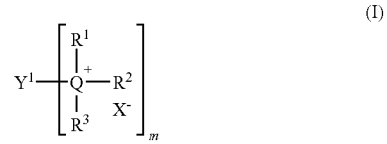

(I)

In Formula (I), $R^1$ to $R^3$ may be the same or different and indicate a $C_1$ to $C_{10}$ alkyl group, $C_3$ to $C_{15}$ cycloalkyl group, $C_2$ to $C_{10}$ hydroxyalkyl group, $C_2$ to $C_{10}$ alkoxyalkyl group, $C_6$ to $C_{20}$ aryl group, or $C_6$ to $C_{20}$ hydroxyaryl group, where a part or all of $R^1$ to $R^3$ may bonded with each other to form a ring, which may have a nitrogen atom, which may have an unsaturated bond and/or which may have a substituent group. X indicates an anion, specifically, at least one anion selected from the group consisting of $Cl^-$, $Br^-$, $I^-$, $ClO_4^-$, $BF_4^-$, $PF_6^-$, $SO_4^{2-}$, $NO_3^-$, $N(SO_2CF_3)_2^-$, $CF_3SO_4^-$, $N(CN)_2^-$ and the like. Q indicates a nitrogen atom or a phosphorus atom. $Y^1$ is a $C_1$ to $C_{24}$, preferably a $C_1$ to $C_{10}$, hydrocarbon group, which may contain a hetero atom (e.g., methylene, ethylene, propylene, butylene, ethylethylene, pentamethylene, hexamethylene, heptamethylene, octamethylene, decamethylene, dodecamethylene, phenylene, xylylene, methylenedioxy, ethylenedioxy, trimethylenedioxy, carbonyldioxy, and sulfonyldioxy). Note that m is an integer of 2 or more, preferably an integer of 2 to 5.

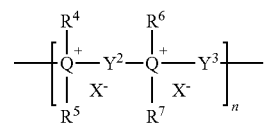

(II)

In Formula (II), $R^4$ to $R^7$ may be the same or different and indicate a $C_1$ to $C_{10}$ alkyl group, $C_3$ to $C_{15}$ cycloalkyl group, $C_2$ to $C_{10}$ hydroxyalkyl group, $C_2$ to $C_{10}$ alkoxyalkyl group, $C_6$ to $C_{20}$ aryl group, or $C_6$ to $C_{20}$ hydroxyaryl group, where $R^4$ and $R^5$ may be bonded with each other to form a ring, which may have a nitrogen atom, which may have an unsaturated bond and/or which may have a substituent group. $R^6$ and $R^7$ may also be bonded to each other, to form a ring, which may have a nitrogen atom, which may have an unsaturated bond and/or which may have a substituent group. X indicates an anion, specifically, at least one anion selected from the group consisting of $Cl^-$, $Br^-$, $I^-$, $ClO_4^-$, $BF_4^-$, $PF_6^-$, $SO_4^{2-}$, $NO_3^-$, $N(SO_2CF_3)_2^-$, $CF_3SO_4^-$, $N(CN)_2^-$ and the like. Q indicates a nitrogen atom or a phosphorus atom. $Y^2$ and $Y^3$ may be the same or different and indicate a $C_1$ to $C_{24}$, preferably a $C_1$ to $C_{15}$, hydrocarbon group which may contain a hetero atom (e.g., methylene, ethylene, propylene, butylene, ethylethylene, pentamethylene, hexamethylene, heptamethylene, octamethylene, decamethylene, dodecamethylene, phenylene, xylylene, methylendioxy, ethylenedioxy, trimethylenedioxy, carbonyldioxy and sulfonyldioxy). Note that n is an integer of 1 or more, preferably an integer of 1 to 5.

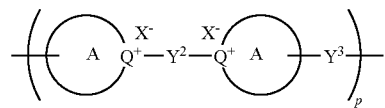

(III)

In Formula (III), ring A indicates a five or six member aromatic ring. The atoms forming the ring A may include a nitrogen atom, oxygen atom or sulfur atom. Further, Q indicates a nitrogen atom or phosphorus atom. X indicates an anion, specifically at least one anion selected from the group consisting of $Cl^-$, $Br^-$, $I^-$, $ClO_4^-$, $BF_4^-$, $PF_6^-$, $SO_4^{2-}$, $NO_3^-$, $N(SO_2CF_3)_2^-$, $CF_3SO_4^-$, $N(CN)_2^-$ and the like. $Y^2$ and $Y^3$ may be the same or different and indicate a $C_1$ to $C_{24}$, preferably a $C_1$ to $C_{15}$, hydrocarbon group which may contain a hetero atom (e.g., methylene, ethylene, propylene, butylene, ethylethylene, pentamethylene, hexamethylene, heptamethylene, octamethylene, decamethylene, dodecamethylene, phenylene, xylylene, methylenedioxy, ethylenedioxy, trimethylenedioxy, carbonyldioxy and sulfonyldioxy). Note that p is an integer of 1 or more, preferably is an integer of 1 to 5.

The polyvalent onium salt compounds having the Formulae (I) to (III) can be synthesized by reacting, for example, a polyvalent halogen compound and tertiary amine compound or a polyvalent halogen compound and a tertiary phosphine compound. Further, as commercially available products, hexadimethrine bromide, polydiallyl dimethylammonium chloride, and the like can be utilized.

According to the present invention, the above-mentioned gel-like or solid electrolyte can be interposed between the two electrodes of a photoelectrode containing a transparent conductive film and metal oxide semiconductor porous film, and a counter electrode arranged facing the photoelectrode to form a photoelectric transducer element. Further, the photoelectric transducer element can be made a dye-sensitized solar cell by supporting a photosensitizing dye by the metal oxide semiconductor porous film.

The photoelectric transducer element and dye-sensitized solar cell shown in FIG. 1 will now be described.

The photoelectrode 4 is composed of a transparent substrate 1, a transparent conductive film 2 and an oxide semiconductor porous film 3. For the transparent substrate 1, a glass sheet, polystyrene, polyethylene, polypropylene, polyethylene terephthalate, polyethylene naphthalate, polycarbonate, polyphenylene sulfide, cyclic olefin polymer, polyether sulfone, polysulfone, polyetherimide, polyarylate, triacetyl cellulose, polymethyl methacrylate, and other resin substrates may be used. Those having good light transparency are preferable.

As the transparent conductive film 2, conductive metal oxides such as antimony- or fluorine-doped tin oxide, aluminum- or gallium-doped zinc oxide or tin-doped indium oxide may be mentioned. The thickness of the conductive film is preferably 0.01 to 10 μm or so. Methods for providing the conductive film can be made by any conventional methods. For example, a coating method, sputtering method, vacuum deposition method, spray pyrolysis method, chemical vapor deposition (CVD) method, sol-gel method, and the like may be mentioned.

The oxide semiconductor porous film 3 can be obtained by coating a dispersion of oxide semiconductor particles on a transparent conductive film 2. As the oxide semiconductor particles, titanium oxide, tin oxide, zinc oxide, tungsten oxide, zirconium oxide, hafnium oxide, strontium oxide, vanadium oxide, niobium oxide and the like may be mentioned. These may be used alone or in any mixture thereof. The dispersion of the oxide semiconductor particles can be obtained by mixing the aforementioned semiconductor particles and a dispersion medium by dispersion devices such as a sand mill, bead mill, ball mill, triple roll mill, colloid mill, ultrasonic homogenizer, Henschel mixer, jet mill. Further, in order to prevent the reaggregation of the particles in the dispersion, acetylacetone, hydrochloric acid, nitric acid, a surface acting agent, chelating agent and the like may be added. Further, for thickening the dispersion, thickening agents such as polyethylene oxide, polyvinyl alcohol, and other polymers, cellulose-based thickening agents, and can be added. As the semiconductor particle dispersions, commercially available products (titanium oxide paste SP100, SP200 available from Showa Denko Co., Ltd., titanium oxide particles Ti-Nanoxide T available from Solaronix SA, titania coating paste PECC01 available from Peccell Technologies, Inc.) may also be used. As the method for coating the dispersion of the semiconductor particles on the transparent conductive film, for example, the known wet film-forming method can be used. The wet film-forming method is not particularly limited, but, for example, the screen printing method, ink jet printing method, roll coating method, doctor blade method, spin coating method, spray coating method and the like may be mentioned.

Further, after coating the dispersion of the oxide semiconductor particle on the transparent conductive film, for the purpose of the improvement in the electronic contact between the fine particles, the improvement in the adhesion with the transparent conductive film and the improvement in the film strength, it is desirable to perform heat treatment, chemical treatment, or plasma or ozone treatment. The temperature of the heat treatment is preferably 40° C. to 700° C., more preferably 40° C. to 650° C. Further, the processing time is not particularly limited, but usually is 10 seconds to 24 hours or so. As the chemical treatment, chemical plating using a titanium tetrachloride aqueous solution, chemical adsorption using a carboxylic acid derivative, electrochemical plating using a titanium trichloride aqueous solution, etc. may be mentioned.

Further, a photoelectric transducer element composed of the aforementioned oxide semiconductor porous film 3, in which a photosensitizing dye is incorporated, is a dye-sensitized solar cell. The photosensitizing dye is not particularly limited so long as the dye has absorption in the visible light band and/or infrared band. A metal complex or an organic dye etc. may be used. Specifically, ruthenium complex dyes having a ligand such as a bipyridine structure, terpyridine structure, or, porphyrin dyes, phthalocyanine dyes, cyanine dyes, merocyanine dyes, xanthene dyes, or the like can be used. The method for incorporating the dye is not particularly limited, but the aforementioned dye may be incorporated by, for example, dissolving the dye in water or alcohol and immersing the porous film 3 in the dye solution or coating the dye solution on the porous film.

As the ruthenium complex dyes, commercially available products (Ruthenium 535 and Ruthenium 535 bis-TBA made by Solaronix SA and PECD 03, PECD 07, and the like made by Peccell Technologies Inc.) can be used. As the merocyanine dyes, commercially available products (D102, D131, D149, and the like of Mitsubishi Paper Mills Ltd.) can be used.

For the electrode 5 serving as the counter electrode of the photoelectrode 4, for example, a metal or a glass or a resin substrate having a conductive film on the surface etc. can be used. As the metal, metals such as platinum, gold, silver, copper, aluminum, indium, titanium can be used. As the resin substrate, in addition to the transparent resin substrate illustrated with the photoelectrode 4, a general resin substrate which is opaque or poor in transparency can also be used. As the conductive film provided on the surface, metals such as platinum, gold, silver, copper, aluminum, indium, titanium; conductive metal oxides such as ruthenium oxide, antimony- or fluorine-doped tin oxide, aluminum- or gallium-doped zinc oxide; tin-doped indium oxide, carbon, and the like may be mentioned. The thickness of the conductive film is preferably 0.01 to 10 μm or so. The method for providing the conductive film may also be any known method. For example, the coating method, sputtering method, vacuum deposition method, spray pyrolysis method, chemical vapor deposition (CVD) method, sol-gel method, and the like may be mentioned.

Further, as a counter electrode 5, it is possible to use an electrode composed of the above substrate on which a conductive polymer film is formed and a conductive polymer film electrode. As the conductive polymer, polythiophene, polypyrrole, polyaniline, and the like may be mentioned. As the method for forming a conductive polymer film on a substrate, the dipping method or spin coating method etc. known as usual wet film-forming methods may be used to form a conductive polymer film can form on a substrate from a polymer dispersion. As the conductive polymer dispersion, the polyaniline dispersion disclosed in PCT/JP 2004/015203 or the commercially available products Baytron P (polythiophene derivative aqueous dispersion made by Bayer AG) or Aqua Pass (polyaniline derivative aqueous solution made by Mitsubishi Rayon Co., Ltd.) and the like can be used. Further, when the substrate is the conductive substrate, in addition to the aforementioned method, the conductive polymer film can be formed on the substrate by an electrolytic polymerization method. For the conductive polymer film electrode, a self-supporting film obtained by peeling from an electrode a conductive polymer film formed on the electrode by the electrolytic polymerization method or a self-supporting film formed from a conductive polymer dispersion using the casting method or spin coating method etc., known as usual wet film forming methods, may be used. Regarding the conductive polymer dispersion referred to here, a mixture of a state of conductive polymer particles dispersed in a solvent and a state of conductive polymers dissolved in a solvent is for convenience referred to as a "conductive polymer dispersion".

EXAMPLES

The present invention will now be further explained by Examples, but the scope of the present invention is by no means limited to these Examples.

Synthesis of Polyvalent Onium Salt Compound 1

According to the following reaction scheme, N-methyl imidazolium and 1,6-diiodohexane were reacted in toluene at a temperature of 80° C. for 16 hours to obtain the diimidazolium salt of Formula (VII). This compound was used for the production of the gel electrolyte below.

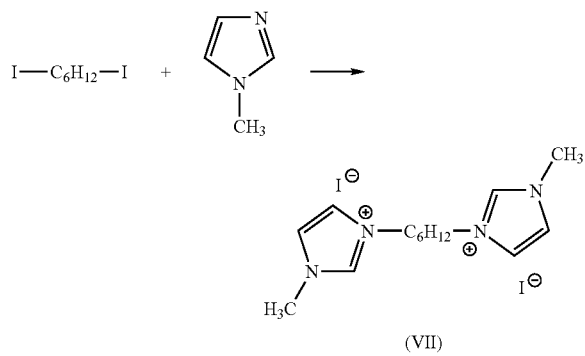

(VII)

Synthesis of Polyvalent Onium Salt Compound 2

The same procedure used in the production of the polyvalent onium salt compound 1 was used to react N-methyl imidazolium and 1,3-diiodopropane to obtain a diimidazolium salt (i.e., polyvalent onium salt compound 2).

Synthesis of Polyvalent Onium Salt Compound 3

The same procedure used in the production of the polyvalent onium salt compound 1 was used to react N-methyl imidazolium and 1,10-diiododecane to obtain a diimidazolium salt (i.e., polyvalent onium salt compound 3).

Example 1

To an ionic liquid 1-methyl-3-propylimidazolium iodide (2 g) (see Formula (VIII)) in which said polyvalent onium salt 1 (50 mg) was dissolved, a lamellar clay mineral Lucentite SPN (300 mg (inorganic content: about 100 mg)) previously swollen and dispersed in toluene was added, while stirring, and then the mixture stirred at room temperature for 3 hours. The reaction solution was allowed to stand, then the toluene solution was removed. Further, the precipitant was washed with toluene and dried to obtain a gel substance. The removed toluene solution and the washed toluene solution were collected and the toluene was distilled off from the collected toluene solution under vacuum to obtain the residue. It was confirmed that the residue thus obtained was the iodide of the ammonium salt present between the layers of the lamellar clay mineral Lucentite SPN from NMR determination and the elemental analysis. Further, from the weight of the residue, it was confirmed that all the ammonium salts present in the lamellar clay mineral Lucentite SPN were substituted with the polyvalent onium salt compound 1 and the ionic liquid. Thus, it was confirmed that the polyvalent onium salt compound 1 and the ionic liquid were inserted between the clay sheets of the lamellar clay mineral and, in turn, the lamellar clay mineral was swollen and dispersed in the ionic liquid containing the polyvalent onium salt compound 1 dissolved therein to thereby form the gel substance. On the other hand, to the gel substance thus obtained, 0.5 mol/L of lithium iodide, 0.3 mol/L of iodine, and 0.58 mol/L of 4-tert-butylpyridine were mixed and dispersed, based upon the ionic liquid 1-methyl-3-propylimidazolium iodide, to obtain a gel electrolyte. The electrolyte thus obtained was interposed between the photoelectrode and the counter electrode so as to prepare the solar cell.

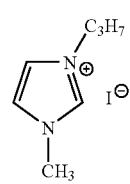

(VIII)

Example 2

The same procedure as in Example 1 was used, except that the polyvalent onium salt 2 (40 mg) was dissolved, instead of the polyvalent onium salt 1, in the ionic liquid 1-methyl-3-propylimidazolium iodide (2 g), to obtain gel substance and gel electrolyte. As a result of the analysis by the same manner as in Example 1, it was confirmed that the polyvalent onium salt compound 2 and the ionic liquid were inserted between the clay sheets of the lamellar clay mineral and, in turn, the lamellar clay mineral was swollen and dispersed in the ionic liquid containing the polyvalent onium salt compound 2 dissolved therein to thereby form the gel substance. On the other hand, the electrolyte thus obtained was interposed between the photoelectrode and the counter electrode so as to prepare the solar cell.

Example 3

The same method as in Example 1 was used, except that the polyvalent onium salt 3 (60 mg) was dissolved, instead of the polyvalent onium salt 1, in the ionic liquid 1-methyl-3-propylimidazolium iodide (2 g), to obtain gel substance and gel electrolyte. As a result of the analysis by the same manner as in Example 1, it was confirmed that the polyvalent onium salt compound 3 and the ionic liquid were inserted between the clay sheets of the lamellar clay mineral and, in turn, the lamellar clay mineral was swollen and dispersed in the ionic liquid containing the polyvalent onium salt compound 3 dissolved therein to thereby form the gel substance. On the other hand, the electrolyte thus obtained was interposed between the photoelectrode and the counter electrode so as to prepare the solar cell.

Example 4

To an ionic liquid 1-methyl-3-propylimidazolium iodide (2 g), in which the polyvalent onium salt 1 (100 mg) was dissolved, a lamellar clay mineral Lucentite SPN (600 mg (inorganic content: about 200 mg)) previously swollen and dispersed in toluene was added, while stirring, and then the mixture stirred at room temperature for 3 hours. The rest of the operation was carried out in the same procedure as Example 1 to obtain solid substance and solid electrolyte. As a result of the analysis by the same manner as in Example 1, it was confirmed that the polyvalent onium salt compound 1 and the ionic liquid were inserted between the clay sheets of the lamellar clay mineral and, in turn, the lamellar clay mineral was swollen and dispersed in the ionic liquid containing the polyvalent onium salt compound 1 dissolved therein to thereby form the solid substance. On the other hand, the electrolyte thus obtained was interposed between the photoelectrode and the counter electrode so as to prepare the solar cell.

Example 5

To an ionic liquid 1-methyl-3-propylimidazolium iodide (2 g), in which said polyvalent onium salt 1 (200 mg) was dissolved, a lamellar clay mineral Lucentite SPN (1.2 g (inorganic content: about 400 mg)) previously swollen and dispersed in toluene was added, while stirring, and then the mixture stirred at room temperature for 3 hours. The rest of the operation was carried out in the same procedure as Example 1 to obtain solid substance and solid electrolyte. As a result of the analysis by the same manner as in Example 1, it was confirmed that the polyvalent onium salt compound 1 and the ionic liquid were inserted between the clay sheets of the lamellar clay mineral and, in turn, the lamellar clay mineral was swollen and dispersed in the ionic liquid containing the polyvalent onium salt compound 1 dissolved therein to thereby form the solid substance. On the other hand, the electrolyte thus obtained was interposed between the photoelectrode and the counter electrode so as to prepare the solar cell.

Example 6

To an ionic liquid 1-methyl-3-propylimidazolium iodide (2 g), in which said polyvalent onium salt 1 (300 mg) was dissolved, a lamellar clay mineral Lucentite SPN (1.8 g (inorganic content: about 600 mg)) previously swollen and dispersed in toluene was added, while stirring, and then the mixture stirred at room temperature for 3 hours. The rest of the operation was carried out in the same procedure as Example 1 to obtain solid substance and solid electrolyte. As a result of the analysis by the same manner as in Example 1, it was confirmed that the polyvalent onium salt compound 1 and the ionic liquid were inserted between the clay sheets of the lamellar clay mineral and, in turn, the lamellar clay mineral was swollen and dispersed in the ionic liquid containing the polyvalent onium salt compound 1 dissolved therein to thereby form the solid substance. On the other hand, the electrolyte thus obtained was interposed between the photoelectrode and the counter electrode so as to prepare the solar cell.

Comparative Example 1

In an ionic liquid 1-methyl-3-propylimidazolium iodide, lithium iodide 0.5 mol/L, iodine 0.3 mol/L and 4-tert-butylpyridine 0.58 mol/L were dissolved at room temperature to obtain an ionic liquid electrolyte. The electrolyte thus obtained was interposed between the photoelectrode and the counter electrode so as to prepare the solar cell.

Comparative Example 2

To only an ionic liquid 1-methyl-3-propylimidazolium iodide (2 g), the lamellar clay mineral Lucentite SPN (300 mg (inorganic content: about 100 mg)), previously swollen and dispersed beforehand in toluene was added while stirring and the mixture stirred at room temperature for 3 hours. The rest of the operation was carried out in the same procedure as Example 1 to obtain fluid substance and fluid electrolyte. As a result of the analysis by the same manner as in Example 1, it was confirmed that the ionic liquid was inserted between the clay sheets of the lamellar clay mineral and, in turn, the lamellar clay mineral was swollen and dispersed in the ionic liquid to thereby form the fluid substance. On the other hand, the electrolyte thus obtained was interposed between the photoelectrode and the counter electrode so as to prepare the solar cell.

Comparative Example 3

In an ionic liquid 1-methyl-3-propylimidazolium iodide (2 g), the polyvalent onium salt 1 (100 mg) was dissolved, then lithium iodine 0.5 mol/L, iodine 0.3 mol/L and 4-tert-butylpyridine 0.58 mol/L were dissolved at room temperature to obtain a liquid electrolyte. The electrolyte thus obtained was interposed between the photoelectrode and the counter electrode so as to prepare the solar cell.

Comparative Example 4

To an ionic liquid 1-methyl-3-propylimidazolium iodide (2 g), a lamellar clay mineral Lucentite SPN (600 mg (inorganic content: about 200 mg)) previously swollen and dispersed in toluene was added, while stirring, and then the mixture stirred at room temperature for 3 hours. The rest of the operation was carried out in the same procedure as Example 1 to obtain gel-like substance and gel-like electrolyte. As a result of the analysis by the same manner as in Example 1, it was confirmed that the ionic liquid was inserted between the clay sheets of the lamellar clay mineral and, in turn, the lamellar clay mineral was swollen and dispersed in the ionic liquid to thereby form the gel-like substance. On the other hand, the electrolyte thus obtained was interposed between the photoelectrode and the counter electrode so as to prepare the solar cell.

Comparative Example 5

To an ionic liquid 1-methyl-3-propylimidazolium iodide (2 g), a lamellar clay mineral Lucentite SPN (1.2 g (inorganic content: about 400 mg)) previously swollen and dispersed in toluene was added, while stirring, and then the mixture stirred at room temperature for 3 hours. The rest of the operation was carried out in the same procedure as Example 1 to obtain solid substance and solid electrolyte. As a result of the analysis by the same manner as in Example 1, it was confirmed that the ionic liquid was inserted between the clay sheets of the lamellar clay mineral and, in turn, the lamellar clay mineral was swollen and dispersed in the ionic liquid to thereby form the solid substance. On the other hand, the electrolyte thus obtained was interposed between the photoelectrode and the counter electrode so as to prepare the solar cell.

The compositions of the electrolytes obtained in Examples 1 to 6 and Comparative Examples 1 to 5 and the states of the electrolytes, as visually observed, and the viscosity and the ion conductivity are shown in Table I.

Preparation of Dye-Sensitized Solar Cell
Preparation of Photoelectrode

A transparent conductive glass substrate (Nippon Sheet Glass Co. Ltd, conductive film of fluorine-doped tin oxide, sheet resistance 8Ω/square) was coated on the surface thereof with a paste prepared by mixing, in a mortar, titanium dioxide powder (AEROXIDE $TiO_2$ P25, average particle size 21 nm, Nippon Aerosil Co., Ltd.), acetylacetone, distilled water and a surfactant (Triton X-100, Acros Organics Inc.), dried, then sintered at 460° C. for 45 minutes to form a porous titanium oxide thin film formed on the transparent conductive glass substrate. The glass substrate having this porous titanium oxide thin film was immersed in an ethanol solution (i.e., concentration $3 \times 10^{-4}$ mol/L) of a ruthenium complex dye (that is, cis-(dithiocyanate)-N,N'-bis(2,2'-bipyridyl-4,4'-dicarboxylic acid) ruthenium (II) complex, Solaronix Inc. Ruthenium 535-bis TBA) for 12 hours. It was then washed with acetonitrile, then dried in a dark place under a flow of nitrogen to incorporate the sensitizing dye into the porous titanium oxide thin film. This was used as a photoelectrode.

Preparation of Platinum Counter Electrode

A transparent conductive glass substrate (Nippon Sheet Glass Co., Ltd, conductive surface of fluorine-doped tin oxide, sheet resistance 8Ω/square) had formed on the surface thereof a platinum thin film having a thickness of approximately 100 nm by the sputtering method. This electrode was used as a counter electrode.

Preparation of Solar Cell

The electrolytes shown in Table I were interposed between the photoelectrodes and the counter electrodes to prepare the solar-cells in each Example.

Evaluation of Solar Cell

Figure 2:
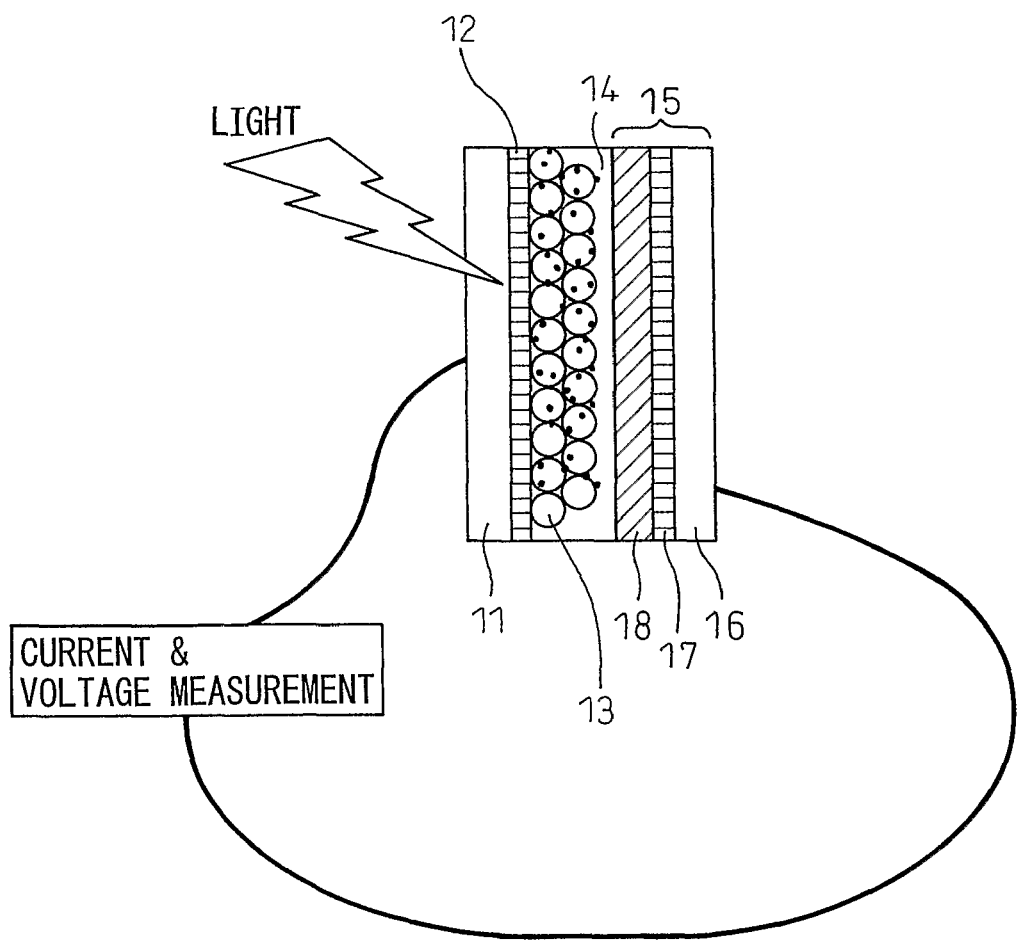
FIG. 2 A diagram showing the basic structure of a cell according to the present invention used in the Examples, etc.

The cells of Examples 1 to 6 and Comparative Examples 1 to 5, as shown in FIG. 2, were irradiated with simulated sunlight of AM (i.e., airmass) 1.5 at a light intensity of 100 mW/cm² from the photoelectrode side using a solar simulator as a light source and were measured for short circuit current, open circuit voltage, fill factor, and conversion efficiency using a current-voltage measurement device (Keithley Instruments Inc. Digital Source Meter 2400). The results of the cells are shown in Table I.

TABLE I

| Components (parts by weight) | Example 1 | Example 2 | Example 3 | Example 4 | Example 5 | Example 6 |
|---|---|---|---|---|---|---|
| Ionic liquid | 100 | 100 | 100 | 100 | 100 | 100 |
| Lamellar clay mineral | 5 | 5 | 5 | 10 | 20 | 30 |
| Polyvalent onium salt 1 | 2.5 | — | — | 5 | 10 | 15 |
| Polyvalent onium salt 2 | — | 2 | — | — | — | — |
| Polyvalent onium salt 3 | — | — | 3 | — | — | — |
| Viscosity (Pa · s) *1 | 330 | 325 | 340 | 520 | 550 | 750 |
| State of electrolyte | Gel | Gel | Gel | Solid | Solid | Solid |
| Ion conductivity (S/cm) *2 | $9.0 \times 10^{-3}$ | $8.8 \times 10^{-3}$ | $9.0 \times 10^{-3}$ | $1.0 \times 10^{-2}$ | $9.3 \times 10^{-3}$ | $9.0 \times 10^{-3}$ |
| Current density (mA/cm²) | 14.7 | 14.4 | 14.2 | 15.1 | 14.7 | 14.5 |
| Open circuit voltage (V) | 0.685 | 0.683 | 0.689 | 0.685 | 0.678 | 0.683 |
| Fill factor | 0.631 | 0.630 | 0.637 | 0.655 | 0.653 | 0.658 |
| Conversion efficiency (%) | 6.35 | 6.20 | 6.23 | 6.77 | 6.51 | 6.52 |

| Components (parts by weight) | Comp. Ex. 1 | Comp. Ex. 2 | Comp. Ex. 3 | Comp. Ex. 4 | Comp. Ex. 5 |
|---|---|---|---|---|---|
| Ionic liquid | 100 | 100 | 100 | 100 | 100 |
| Lamellar clay mineral | — | 5 | — | 10 | 20 |
| Polyvalent onium salt 1 | — | — | 5 | — | — |
| Polyvalent onium salt 2 | — | — | — | — | — |
| Polyvalent onium salt 3 | — | — | — | — | — |
| Viscosity (Pa · s) *1 | 1.2 | 120 | 1.1 | 320 | 540 |
| State of electrolyte | Fluid | Fluid | Fluid | Gel | Solid |
| Ion conductivity (S/cm) *2 | $1.3 \times 10^{-3}$ | $3.6 \times 10^{-3}$ | $3.4 \times 10^{-3}$ | $3.3 \times 10^{-3}$ | $3.1 \times 10^{-3}$ |
| Current density (mA/cm²) | 12.8 | 13.1 | 12.8 | 13.7 | 13.3 |
| Open circuit voltage (V) | 0.683 | 0.689 | 0.685 | 0.688 | 0.686 |
| Fill factor | 0.652 | 0.645 | 0.635 | 0.646 | 0.641 |
| Conversion efficiency (%) | 5.70 | 5.82 | 5.57 | 6.09 | 5.85 |

*1 The viscosity was determined under the conditions of 30° C. and 20 rpm using BH type rotary viscometer available from Tokyo Keiki Co., Ltd.
*2 The ion conductivity was determined using an AC impedance measuring device (i.e., Model 1260 of Solartron Corporation) such that the electrolyte is sandwiched by Teflon spacer (100 μm thick) between two transparent conductive glass electrodes (conductive surface: fluorine-doped tin oxide, sheet resistivity: 8Ω/□, manufactured by Nippon Sheet Glass Co., Ltd.)

The electrolytes of Examples 1 to 6 jointly using polyvalent onium salts, despite being gel-like or solid electrolytes, had higher ion conductivity and conversion efficiencies than a liquid electrolyte, that is, the ionic liquid electrolyte of Comparative Example 1. Further, when the content of the lamellar clay mineral is 5 parts by weight, the electrolytes of Examples 1 to 3 jointly using polyvalent onium salts became gel electrolytes, while in Comparative Example 2 not using a polyvalent onium salt, a gel electrolyte could not be formed. Further, the electrolytes of Examples 1 to 3 have a higher ion conductivity and conversion efficiency, compared to the electrolyte of Comparative Example 2. When the content of the lamellar clay mineral is increased and a solid electrolyte was formed, Examples 4 to 6 jointly using polyvalent onium salts had a higher ion conductivity and conversion efficiency, compared with Comparative Examples 4 and 5, which did not jointly use polyvalent onium salts. Further, the conversion efficiencies of the solid electrolytes of Examples 4 to 6 were kept in the 6% range, even if the contents of the lamellar clay mineral were increased.

As explained above, according to the present invention, by jointly using a polyvalent onium salt in an electrolyte composed of an ionic liquid electrolyte and a lamellar clay mineral and/or organically modified lamellar clay mineral, it is possible to decrease the clay content required for gelling of the electrolyte and possible to increase the photoelectric conversion efficiency. Further, according to the present invention, by jointly using a polyvalent onium salt in the clay-gel electrolyte, it is possible to increase the clay content at the equal or better efficiency as the photoelectric conversion efficiency exhibited by the liquid electrolyte before gelling, and possible to increase the gelling degree of the electrolyte and enable solidification.

INDUSTRIAL APPLICABILITY

As explained above, according to the present invention, by jointly using a polyvalent onium salt in the clay gel electrolyte, it is possible to decrease the clay content required for gelling of the electrolyte and possible to increase the photoelectric conversion efficiency. Development of various applications as a dye-sensitized solar cell may be anticipated.

The invention claimed is:

1. A gel-like or solid electrolyte comprising (i) an electrolyte solution containing an electrolyte dissolved in an organic solvent, (ii) a lamellar clay mineral and/or an organically modified lamellar clay mineral and (iii) a polyvalent onium salt compound, wherein the polyvalent onium salt compound is at least one salt selected from the group consisting of compounds having the formulae (I) to (III)

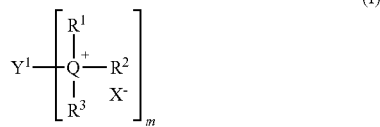
(I)

wherein $R^1$ to $R^3$ may be the same or different and indicate an alkyl group, cycloalkyl group, hydroxyalkyl group, alkoxyalkyl group, aryl group or hydroxyaryl group, where a part or all of $R^1$ to $R^3$ may be bonded with each other to form a ring, which may have a nitrogen atom, which may have an unsaturated bond and/or may have a substituent group, X is an anion, Q indicates a nitrogen atom or a phosphorus atom, $Y^1$ is a hydrocarbon group which may contain a hetero atom and m is an integer of 2 or more;

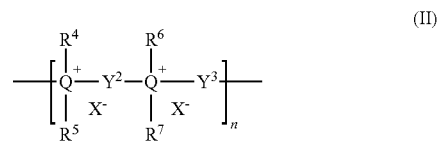
(II)

wherein $R^4$ to $R^7$ may be the same or different and indicate an alkyl group, cycloalkyl group, hydroxyalkyl group, alkoxyalkyl group, aryl group or hydroxyaryl group, where $R^4$ and $R^5$ may be bonded with each other and form a ring which may have a nitrogen atom, which may have an unsaturated bond and/or which may have a substituent group, $R^6$ and $R^7$ may also be bonded to each other to form a ring, which may have a nitrogen atom, which may have an unsaturated bond and/or which may have a substituent group, Q indicates a nitrogen atom or a phosphorus atom, X is an anion, $Y^2$ and $Y^3$ may be the same or different and indicate a hydrocarbon group which contains a hetero atom and n is an integer of 1 or more);

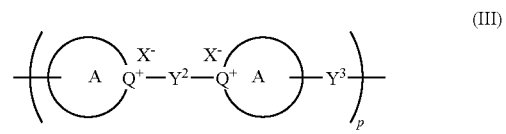
(III)

wherein a ring A indicates an aromatic ring of five or six members, the atoms forming the ring A may include a nitrogen atom, oxygen atom or sulfur atom, Q indicates a nitrogen atom or phosphorus atom, X is an anion, $Y^2$ and $Y^3$ may be the same or different and indicate a hydrocarbon group which contains a hetero atom and p is an integer of 1 or more.

2. A gel-like or solid electrolyte as claimed in claim 1, wherein the organic solvent is an ionic liquid.

3. A gel-like or solid electrolyte as claimed in claim 2, wherein the ionic liquid is at least one liquid selected from the group consisting of quaternary ammonium salts, imidazolium salts, pyridinium salts, piperidinium salts, and pyrrolidinium salts.

4. A gel-like or solid electrolyte as claimed in claim 1, wherein the amount of lamellar clay mineral and/or organically modified lamellar clay mineral is 1 to 60 parts by weight and the amount of the polyvalent onium salt compound is 1 to 60 parts by weight, both based upon 100 parts by weight of the electrolyte solution containing an electrolyte dissolved in an organic solvent.

5. A photoelectric transducer element comprising a photoelectrode containing a transparent conductive film and metal oxide semiconductor porous film, a counter electrode arranged facing the photoelectrode, and a gel-like or solid electrolyte according to claim 1 interposed between the two electrodes.

6. A dye-sensitized solar cell comprising a photoelectric transducer element according to claim 5 and a photosensitizing dye supported on the metal oxide semiconductor porous film of the photoelectric transducer element.

7. A gel-like or solid electrolyte as claimed in claim 2, wherein the amount of lamellar clay mineral and/or organically modified lamellar clay mineral is 1 to 60 parts by weight and the amount of the polyvalent onium salt compound is 1 to 60 parts by weight, both based upon 100 parts by weight of the electrolyte solution containing an electrolyte dissolved in an organic solvent.

8. A gel-like or solid electrolyte as claimed in claim 3, wherein the amount of lamellar clay mineral and/or organically modified lamellar clay mineral is 1 to 60 parts by weight and the amount of the polyvalent onium salt compound is 1 to 60 parts by weight, both based upon 100 parts by weight of the electrolyte solution containing an electrolyte dissolved in an organic solvent.

9. A photoelectric transducer element comprising a photoelectrode containing a transparent conductive film and metal oxide semiconductor porous film, a counter electrode arranged facing the photoelectrode, and a gel-like or solid electrolyte according to claim 2 interposed between the two electrodes.

10. A photoelectric transducer element comprising a photoelectrode containing a transparent conductive film and metal oxide semiconductor porous film, a counter electrode arranged facing the photoelectrode, and a gel-like or solid electrolyte according to claim 3 interposed between the two electrodes.

11. A photoelectric transducer element comprising a photoelectrode containing a transparent conductive film and metal oxide semiconductor porous film, a counter electrode arranged facing the photoelectrode, and a gel-like or solid electrolyte according to claim 5 interposed between the two electrodes.

12. A gel-like or solid electrolyte as claimed in claim 1, wherein the polyvalent onium compound is at least one salt selected from the group consisting of compounds having the formula (I)

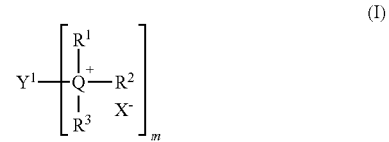

(I)

wherein $R^1$ to $R^3$ may be the same or different and indicate an alkyl group, cycloalkyl group, hydroxyalkyl group, alkoxyalkyl group, aryl group or hydroxyaryl group, where a part or all of $R^1$ to $R^3$ may be bonded with each other to form a ring, which may have a nitrogen atom, which may have an unsaturated bond and/or may have a substituent group, X is an anion, Q indicates a nitrogen atom or a phosphorus atom, $Y^1$ is a hydrocarbon group which may contain a hetero atom and m is an integer of 2 or more.

* * * * *